United States Patent [19]
Raque et al.

[11] Patent Number: 5,174,472
[45] Date of Patent: Dec. 29, 1992

[54] CONTROL SYSTEM FOR TIMING A SEQUENCE OF EVENTS

[75] Inventors: Glen F. Raque; Edward A. Robinson, both of Louisville, Ky.

[73] Assignee: Raque Food Systems, Inc., Louisville, Ky.

[21] Appl. No.: 687,715

[22] Filed: Apr. 18, 1991

[51] Int. Cl.$^5$ .............................................. G01F 11/00
[52] U.S. Cl. ...................................... 222/1; 222/52; 222/644; 53/493; 417/12; 417/18; 364/569
[58] Field of Search ................. 222/1, 52, 61, 63, 309, 222/389, 642, 644, 639; 141/94; 53/493; 417/12, 18, 290, 398; 137/624.15; 364/479, 569; 368/107, 110, 113; 307/141, 141.4

[56] References Cited

U.S. PATENT DOCUMENTS

| | | | |
|---|---|---|---|
| 2,019,299 | 10/1935 | Fox et al. | 222/643 |
| 2,159,559 | 5/1939 | Lawyer | 222/643 |
| 2,831,214 | 4/1958 | Eyles et al. | 222/638 |
| 2,862,240 | 12/1958 | Strauss | 222/638 |
| 3,185,344 | 5/1965 | Kenney | 222/20 |
| 3,343,722 | 9/1967 | Santos | 222/638 |
| 3,456,839 | 6/1969 | Glisenti | 222/638 |
| 3,560,863 | 2/1971 | Baumoel | 307/141 |
| 3,570,715 | 3/1971 | Evers | 222/54 |
| 3,731,856 | 5/1973 | Young | 222/477 |
| 4,057,173 | 11/1977 | Tal | 222/20 |
| 4,318,431 | 3/1982 | Evans | 222/644 |
| 4,331,262 | 5/1982 | Snyder et al. | 222/37 |
| 4,334,636 | 6/1982 | Paul | 222/644 |
| 4,478,355 | 10/1984 | Houman | 222/644 |
| 4,511,977 | 4/1985 | Schuettpelz | 364/569 |
| 4,613,950 | 9/1986 | Knierim et al. | 364/569 |
| 4,676,403 | 6/1987 | Goudy, Jr. et al. | 222/644 |
| 4,699,297 | 10/1987 | Raque et al. | 222/148 |
| 4,823,988 | 4/1989 | Raque et al. | 222/148 |
| 4,831,603 | 5/1989 | Yamagishi | 368/113 |

Primary Examiner—Andres Kashnikow
Assistant Examiner—Philippe Derakshani
Attorney, Agent, or Firm—Barnes & Thornburg

[57] ABSTRACT

A control system and method are provided for controlling the timing of a dispenser including a valve which moves alternately between a product-loading position and a product-dispensing position in a repeated cycle. The dispenser also includes a mechanism for dispensing a product from the dispenser after each time the valve moves to its product-dispensing position. The control system includes a detector which detects the time of which the valve reaches its product-dispensing position and a mechanism for generating a control signal at a predetermined time to actuate the dispensing mechanism when the valve reaches its product-dispensing position. The control system also includes a sensor for sensing the time that the dispensing mechanism actually begins dispensing product. The control system further determines the time difference between the time the valve reaches its product-dispensing position and the time the dispensing mechanism actually begins dispensing the product. The control system adjusts the predetermined time that the control signal is generated to actuate the dispensing mechanism for the next cycle of the valve by an amount based on the time difference between the time the valve reaches its product-dispensing position and the time the dispensing mechanism actually begins dispensing product to maintain the time difference within a predetrmined time range.

30 Claims, 2 Drawing Sheets

CONTROL SYSTEM FOR TIMING A SEQUENCE OF EVENTS

BACKGROUND AND SUMMARY OF THE INVENTION

The present invention relates to a control system and method for timing first and second events which occur repeatedly in a sequential cycle. The control system is designed to maintain the time difference between the time a first event in the sequence is completed and the time a second event begins within a predetermined acceptable time range.

In various types of control systems, a series of sequential events are often performed in a repeated cycle to produce a desired result. The cycle is repeated over and over to continuously produce or process a product. When a repeated cycle of events is performed, it is desirable to have the second event begin as soon as possible after completion of the first event to maximize the efficiency of the system.

According to the present invention, a method is provided for controlling the timing of first and second events which occur repeatedly in a sequential cycle. The second event begins after completion of the first event. The method includes the step of setting a predetermined time to begin the second event after completion of the first event. The method also includes the steps of detecting the time at which the first event is completed and detecting the time that the second event actually begins. The method further includes the step of determining the time difference between the time the first event is completed and the time the second event begins. The method still further includes the step of adjusting the predetermined time that a control signal is generated to begin the second event in the next cycle of first and second events by an amount of time based on the time difference between the time the first event is completed and the time the second event begins to maintain the time difference within a predetermined time range.

In the illustrated embodiment of the present invention, a control system is provided for controlling the timing of a dispenser apparatus including a valve which moves alternately between a product-loading position and a product-dispensing position in a repeated cycle and means for dispensing a product from the dispenser after each time the valve is in its product-dispensing position. The system includes means for detecting the time that the valve reaches its product-dispensing position. The control system also includes means for generating a control signal at a predetermined time to actuate the dispensing means when the valve reaches its product-dispensing position and means for sensing the time that the dispensing means actually begins dispensing product. The system further includes means for determining the time difference between the time the valve reaches its product-dispensing position and the time the dispensing means actually begins dispensing the product. The system still further includes means for adjusting the predetermined time that the control signal is generated to actuate the dispensing means for the next cycle of the valve by an amount based on the time difference between the time the valve reaches its product-dispensing position and the time the dispensing means actually begins dispensing product to maintain the time difference within a predetermined time range.

By maintaining the time difference within the predetermined time range, the present invention improves the efficiency of the dispenser. This permits the dispenser to dispense product more slowly while maintaining the same amount of product output in a predetermined time period. By dispensing product more slowly, the product can be controlled more easily. This can advantageously reduce splashing or spilling of the product as it is being dispensed. In addition, by maintaining the time difference within the acceptable range, the dispenser can dispense more product in a set time if the dispensing speed remains constant. This advantageously increases the productivity of the dispenser.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
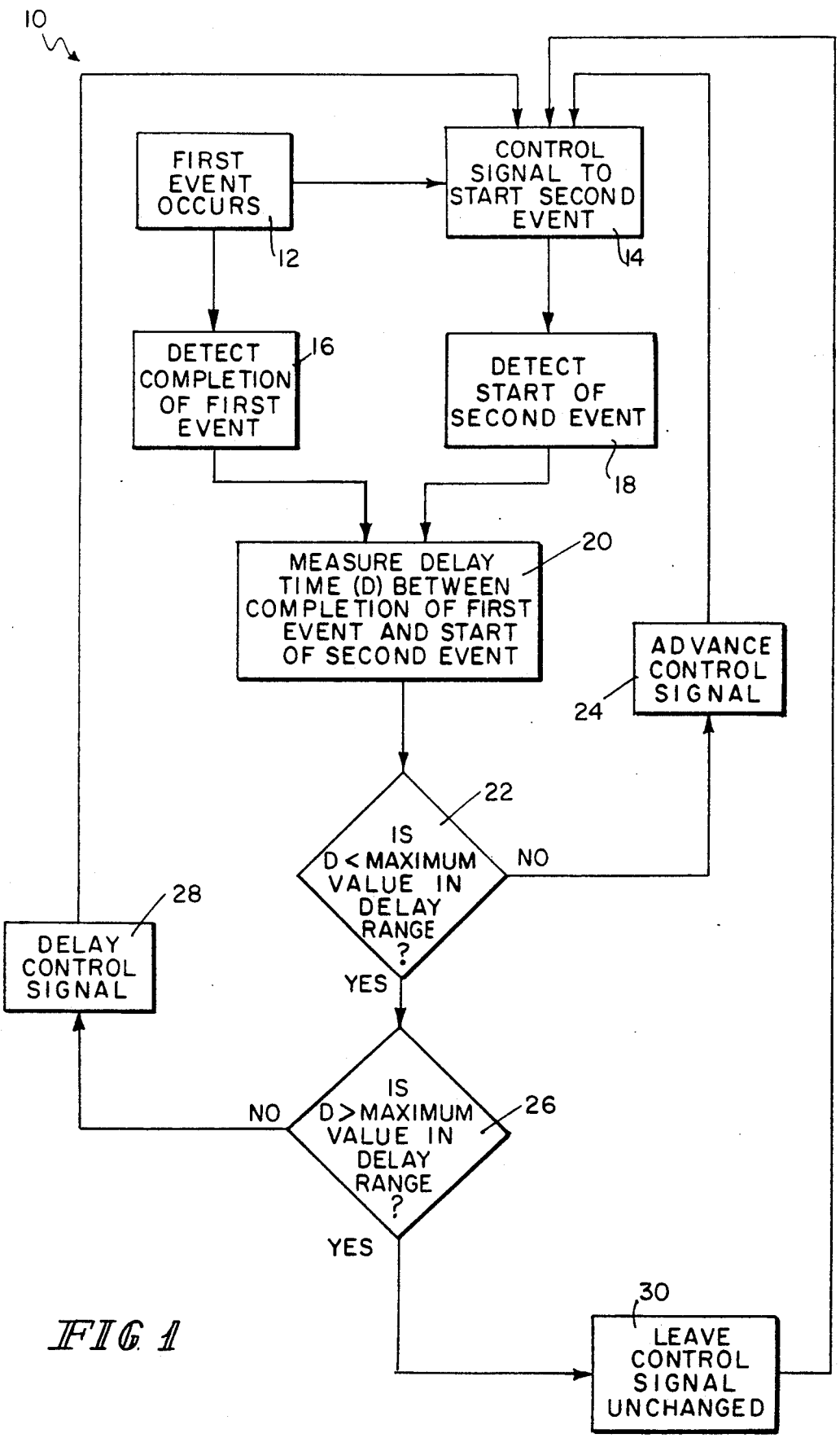
FIG. 1 is a flow chart illustrating the operation of the control system of the present invention.

Referring now to the drawings, FIG. 1 is a flow chart illustrating operation of the control system 10 of the present invention. The control system 10 is designed to control the timing of a sequence of events which occur repeatedly in a sequential cycle. In other words, a first event is performed, and after the first event is completed, a second event begins. At a later time, the first event is performed again, followed by the second event. This cycle continues to repeat itself.

There is a delay between the time the first event is completed and the time the second event begins. Initially, the second event is set to occur at an ideal delay time after the first event ends. However, after the sequential cycle is repeated several times, the actual delay time tends to drift away from the ideal delay time. The actual delay time can either become longer or shorter than the ideal time delay. The control system 10 of the present invention is designed to maintain the actual delay time within a predetermined acceptable time range near the ideal delay time. The acceptable time range includes a maximum acceptable delay time and a minimum acceptable delay time. These times can be set and adjusted by an operator of the system depending upon the type of events being performed.

As illustrated in FIG. 1, the first event occurs as indicated by box 12. At a predetermined time, a control signal is generated to begin the second event so that the second event begins after completion of the first event. This step is indicated in box 14. A first sensor or detector is provided for detecting the time that the first event is completed as indicated in box 16, and a second sensor or detector is provided for detecting the time that the second event actually begins as illustrated in box 18. The times detected by detectors 16 and 18 are compared at box 20 to measure the time difference or delay time between completion of the first event and the beginning of the second event. The actual delay time is compared to the maximum acceptable delay time value in the preset range of time values at box 22. If the delay time is greater than the maximum acceptable delay time value, the control signal for signalling the start of the second event in the next cycle is advanced as illustrated in box 24. This reduces the delay time between completion of the first event and the start of the second event in the next cycle. The control signal is typically advanced by an amount of time equal to the actual delay time minus the preset ideal delay time set for the system which is preferably a time near the midpoint of the present time range. Alternately, the control signal may be advanced by a preset time.

If the delay time is less than the maximum acceptable delay time value in the preset delay range, another comparison is made in box 26. The actual delay time is compared to the minimum acceptable delay time value of the preset delay range. If the actual delay time is less than the minimum acceptable delay time value, then the second event was started too soon after the end of the first event. Therefore, the control signal to start the second event in the next cycle of first and second events is delayed as indicated in box 28. This increases the delay time in the next cycle between the completion of the first event and the start of the second event. The control signal is typically delayed by an amount of time equal to the preset ideal delay time minus the actual delay time. Alternately, the control signal may be delayed by a preset time.

If the delay time is greater than the minimum value in the delay range as measured in box 26, then the actual delay time is within the acceptable range of delay time values which have been preset by an operator. Therefore, the predetermined time at which control signal is generated is unchanged for the next cycle of first and second events as indicated by box 30. It will be appreciated that while for illustrative purposes the comparative step in box 22 is shown as preceeding the comparative step in box 26, the sequential order of the steps may be reversed; i.e. step 26 may preceed step 22 without departing from the scope of the preset invention. Further, it is possible to combine the comparative steps 22 and 26 in a single step where the measured delay time is compared to the delay range without departing from the scope of the present invention. If the measured delay time is within the delay range, then the control signal is not changed but if the measured delay time is outside the delay range then the control signal is either delayed or advanced.

The system 10 of the present invention is a continuously updating system. After each occurrence of the first and second events, the delay time is measured and compared to the acceptable maximum and minimum values in the preset delay range as discussed above. By continuously updating the time the control signal is generated for beginning the second event, the control system of the present invention maintains the delay time between the completion of the first event and the start of the second event within an acceptable delay range or "grey zone". By maintaining the timing of the first and second events within the acceptable range, the system maintains the desired efficiency of the sequence of events being performed.

Figure 2:
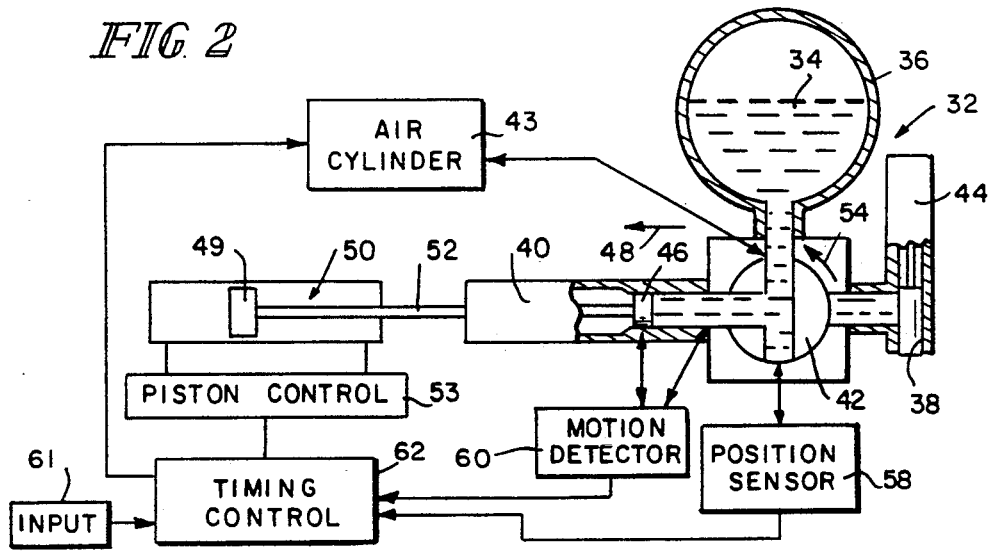
FIG. 2-4 are diagrammatical views illustrating the control system of the present invention in operation with a dispensing apparatus for dispensing a product from a supply tank.
Figure 3:
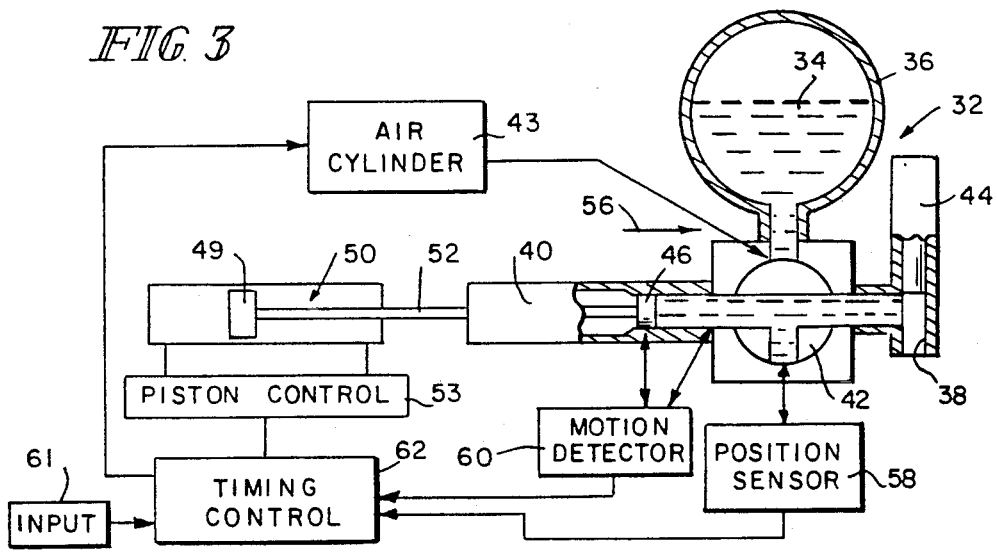
Figure 4:
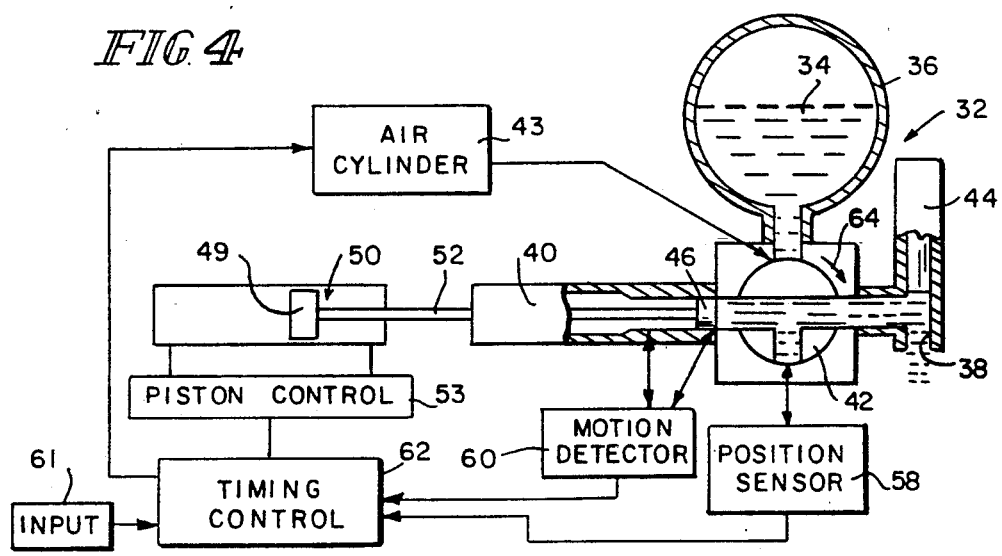

FIGS. 2-4 illustrate the control system of the present invention incorporated with a product dispenser apparatus 32. The dispenser apparatus 32 is a conventional dispenser and is further described in detail in U.S. Pat. Nos. 4,699,297 and 4,823,988 which are both assigned to the assignee of the present invention. The product dispenser apparatus 32 is configured to dispense a product 34, typically a food product, from a supply tank 36 into a container (not shown) situated below an outlet opening 38 of dispenser apparatus 32. Dispenser apparatus 32 includes a product cylinder 40, a rotary valve 42, an air cylinder 43 for rotating rotary valve 42, and an outlet cylinder 44. A movable plunger (not shown) of air cylinder 43 controls a rack and pinion mechanism (not shown) for rotating rotary valve 42 in a conventional manner. When rotary valve 42 is situated in its product-loading position illustrated in FIG. 2, supply tank 36 and product cylinder 40 are in communication. A plunger or piston 46 inside product cylinder 40 is moved in the direction of arrow 48 to draw a portion of the product 34 from the supply tank 36 into the product cylinder 40. Movement of the piston 46 is controlled by a movable piston 49 located inside air cylinder 50. Piston 49 is connected to piston 46 by connecting rod 52. A piston control 53 is used to move piston 49 inside cylinder 50.

After movable piston 49 reaches a retracted position shown in FIGS. 2 and 3, a predetermined amount of product 34 has been drawn or loaded into product cylinder 40. Rotary valve 42 then rotates in a direction of arrow 54 shown in FIG. 2 from its product-loading position to its product-dispensing position illustrated in FIGS. 3 and 4. Again, rotation of rotary valve 42 is controlled by air cylinder 43. When the rotary valve 42 is situated in its product-dispensing position, product cylinder 40 and outlet cylinder 44 are in communication. After rotary valve 42 reaches its product-dispensing position, a control signal causes piston 49 and piston 46 to move in the direction of arrow 56 shown in FIG. 3 to dispense the product 34 from the dispenser 32 through outlet 38.

The control system of the present invention is designed to maintain the delay time between the time the rotary valve 42 reaches its product-dispensing position illustrated in FIGS. 3 and 4 and the time the piston 46 begins movement to dispense product from the dispenser assembly 32 within an acceptable time range. An operator can program both an ideal delay time and an acceptable delay range into the control system for the dispenser apparatus 32. The acceptable delay range is preferably 5-10 milliseconds, but may be set to different times depending on the type of product 34 being dispensed by dispenser 32. A position sensor 58 is used to detect the time at which rotary valve 42 reaches its product-dispensing position. Illustratively, position sensor 58 is a proximity switch which senses timing pockets machined into the plunger of air cylinder 43 at first and second locations corresponding to the product-loading and product-dispensing positions of rotary valve 42. Therefore, position sensor 58 senses the time at which rotary valve 42 reaches its product-dispensing position (FIGS. 3 and 4) and the time at which rotary valve 42 reaches it product-loading position (FIG. 2). A motion detector 60 is used to detect the time that movement of piston 46 begins. Motion detector 60 can be a proximity switch which detects the position of piston 46 at the retracted end position of its stroke and at the extended end position of its stroke. Position sensor 58 generates a timing signal indicating the time that the valve 42 reaches its product-dispensing position. Motion detector 60 generates a timing signal indicating the time that pistons 49 and 46 begin moving. Input control 61 is a switch to start operation of the dispenser apparatus 32.

A timing control unit 62 is connected between the outputs of motion detectors 60 and position sensor 58 and piston control 53. The timing control unit 62 adjusts the time at which a control signal is generated to move the piston 49 from its retracted position shown in FIGS. 2 and 3 to its extended position shown in FIG. 4 in the next dispensing sequence. The control signal from piston control 53 causes pressure to enter air cylinder 50 to move piston 49 to dispense the product 34. Timing control unit 62 also controls signals which move the plunger of air cylinder 43 to move rotary valve 42.

Timing control 62 is illustratively a programmable controller which is programmed to maintain the timing of the dispenser apparatus 32 within the desired preset ranges. Any programmable controller having a scan rate of at least 10–12 msec per 1000 lines of program instructions can be used. Preferably, the programmable controller has a scan rate less than the 10–12 msec. Examples of programmable controllers which can be used include a Texas Instruments Series 405 programmable controller, an Allen Bradley Model 12 programmable controller, or a General Electric Series 1 Plus programmable controller. The programmable controllers are programmed in accordance with the flow chart illustrated in FIG. 1.

Timing control 62 operates in a manner similar to system 10 shown in FIG. 1, with position sensor 58 and motion sensor 60 providing the function of boxes 16 and 18, respectively. The position sensor 58 detects completion of the first event when the rotary valve 42 reaches its Product-dispensing position. Motion detector 60 detects the start of the second event when piston 46 begins movement. These steps are illustrated in boxes 16 and 18, respectively, of FIG. 1. Timing control 62 then measures the delay time between the time the rotary valve 42 reaches its product-dispensing position in a time the piston 46 begins movement. The delay time is compared to a maximum preset value in the acceptable delay range. The ideal time delay as well as the acceptable delay range are programmed into the programmable controller or timing control 62. This permits the values of the ideal time delay and the acceptable delay range to be changed depending on the specific operation of the dispenser 32. As discussed above, the acceptable delay range is preferably about 5–20 milliseconds, but may be set to any desired range. If the actual delay time is greater than the maximum value in the acceptable delay range, the control signal for actuating movement of the pistons 49 and 46 in the next sequence of the dispenser 32 is advanced so that the delay time for the next dispensing cycle is reduced.

If the delay time is less than the maximum acceptable time delay, the actual delay time is then compared to the minimum time value in the preset delay range. If the actual delay time is less than the minimum time value in the accepted delay range, then the signal for actuating movement of pistons 49 and 46 in the next dispensing cycle is delayed to increase the delay time between the time rotary valve 42 reaches its product-dispensing position and the time piston 46 actually begins movement for the next dispensing cycle. If the actual delay time is greater than the minimum value in the delay range, then the dispenser is operating within the acceptable preset delay range and the predetermined time that the control signal is generated to move pistons 49 and 46 is unchanged for the next cycle.

By continuously monitoring the delay time in the system, the efficiency of the system is maintained. By reducing delay time, the present invention provides a time savings for each cycle of the dispenser 32 of about 25–30 msec. Therefore, the dispenser apparatus 32 can be used to dispense more product in a predetermined time, or the product 34 can be dispensed more slowly while maintaining the same production rates.

Timing control 62 can also be used to control the timing of air cylinder 43 which controls rotation of rotary valve 42. Timing control 62 can control the delay time between the time that piston 46 reaches its extended position shown in FIG. 4 until the time that rotary valve 42 begins movement in the direction of arrow 64 to return to its product-loading position shown in FIG. 2. In this case, the first event is the piston 46 moving from its retracted position shown in FIGS. 2 and 3 to its extended position shown in FIG. 4. The second event is rotation of the valve from its product-dispensing position shown in FIGS. 3 and 4 to its product-loading position shown in FIG. 2. Timing control 62 would compare the delay between the time piston 46 reaches its extended position (completion of the first event) until air cylinder 43 begins movement of rotary valve 42 (start of second event). Motion detector 60 senses when piston 46 reaches its extended position, and position sensor 58 detects movement of rotary valve 42. Motion detector 60 senses when piston 46 reaches its extended position, and position sensor 58 detects movement of rotary valve 42. If the delay time is outside the acceptable range, a control signal for actuating air cylinder 43 during the next cycle will be advanced or delayed to bring the delay time within the acceptable range in accordance with the same procedure discussed above and illustrated in the flow chart in FIG. 1. Any conventional motion detectors or proximity sensors can be used for motion detector 60 and position sensor 58.

Timing control 62 can also be used to control the timing of movement of piston 46 from its extended position to its retracted position after rotary valve 42 reaches its product-loading position shown in FIG. 2. In this case, the first event is the rotary valve 42 moving its product-dispensing position to its product-loading position. The second event is the piston 46 moving from its extended position shown in FIG. 4 to its retracted position shown in FIGS. 2 and 3 to draw the product 34 from supply tank 36 into product cylinder 40. Timing control 62 can be used to advance or delay the time that a control signal is generated to cause piston control 53 to move piston 46. This adjustment maintains the time delay between the time rotary valve reaches its product-loading position (completion of the first event) until the time piston 46 begins movement in direction of arrow 48 shown in FIG. 2 (start of second event) within the acceptable delay range. Position sensor 58 detects when rotary valve 42 reaches its product-loading position and motion detector 60 senses when motion of piston 46 begins. This is accomplished as discussed above with reference to FIGS. 2–4 and as illustrated in the flow chart of FIG. 1.

In addition, the timing control 62 can be used to control the time air cylinder 43 begins to move rotary valve 42 in the direction of arrow 54 after piston 46 reaches its retracted position shown FIGS. 2 and 3. In this case, the first event is the piston moving from its extended position to its retracted position. The second event is the valve moving from its product-loading position to its product-dispensing position. By controlling the time that the air cylinder 43 begins movement of valve 42, timing control 62 can maintain the delay time between the time piston 46 stops at its retracted position (completion of first event) until the time valve 42 begins movement from its product-loading position to its product-dispensing position (start of second event) within the predetermined acceptable range. Motion detector 60 senses when the piston 46 stops in its retracted position, and position sensor 58 detects movement of rotary valve 42. Again, control of the timing is accomplished as discussed above with reference to FIGS. 2-4 and as illustrated in the flow chart of FIG. 1.

Therefore, the timing control 62 of the present invention can be used in at least four different ways to control the timing of dispenser apparatus 32. It is understood that one or more of these timing controls may be used during any dispensing operation.

Although the invention has been described in detail with reference to certain preferred embodiments, variations and modifications exist within the scope and spirit of the invention as described and defined in the following claims.

What is claimed is:

1. A method for controlling the timing of a dispenser apparatus including a valve which moves alternately between a product-loading position and a product-dispensing position in a repeated cycle and means for dispensing a product from the dispenser after each time the valve moves to its product-dispensing position, the method comprising the steps of:
    setting a predetermined time for the dispensing means to begin dispensing the product after the valve reaches its product-dispensing position,
    detecting the time at which the valve reaches its product-dispensing position,
    detecting the time that the dispensing means actually begins dispensing the product,
    determining the time difference between the time the valve reaches its product-dispensing position and the time the dispensing means actually begins dispensing the product, and
    adjusting the predetermined time that a control signal is generated to actuate the dispensing means in the next cycle of the valve by an amount of time based on the time difference between the time the valve reaches its product-dispensing position and the time the dispensing means begins dispensing the product to maintain the time difference within a predetermined time range.

2. The method of claim 1, wherein the predetermined time range is about 5-20 milliseconds.

3. A method for controlling the timing of a dispenser apparatus including a valve which moves alternately between a product-loading position and a product-dispensing position in a repeated cycle and means for dispensing a product from the dispenser after each time the valve moves to its product-dispensing position, the method comprising the steps of:
    setting a predetermined time for the dispensing means to begin dispensing the product after the valve reaches its product-dispensing position,
    detecting the time at which the valve reaches its product-dispensing position,
    detecting the time that the dispensing means actually begins dispensing the product,
    determining the actual time difference between the time the valve reaches its product-dispensing position and the time the dispensing means actually begins dispensing the product,
    comparing the actual time difference to a preset range of time differences to determine whether the actual time difference between the time the valve reaches its product-dispensing position and the time the dispensing means actually begins dispensing the product is within a preset range of the time differences,
    adjusting the predetermined time that a control signal is generated to actuate the dispensing means in the next cycle of the valve by an amount of time based on the time difference between the time the rotary valve reaches its product-dispensing position and the time the dispensing means begins dispensing the product only if the actual time difference is outside the preset range of time differences.

4. The method of claim 3 wherein the preset range of time differences is about 5-20 milliseconds.

5. A control system for controlling the timing of a dispenser apparatus including a valve which moves alternately between a product-loading position and a product-dispensing position in a repeated cycle and means for dispensing a product from the dispenser after each time the valve is in its product-dispensing position, the control system comprising
    means for detecting the time at which the valve reaches its product-dispensing position,
    means for generating a control signal at a predetermined time to actuate the dispensing means after the valve reaches its product-dispensing position,
    means for sensing the time that the dispensing means actually begins dispensing product,
    means for determining the actual time difference between the time the valve reaches its product-dispensing position and the time the dispensing means actually begins dispensing the product, and
    means for adjusting the predetermined time that the control signal is generated to actuate the dispensing means for the next cycle of the valve by an amount of time based on the time difference to maintain the time difference between the time the rotary valve reaches its product-dispensing position and the time the dispensing means begins dispensing the product within a predetermined time range.

6. The system of claim 5, wherein the predetermined time range is about 5-20 milliseconds.

7. The system of claim 5, wherein the detecting means includes a position sensor for detecting the position of the valve.

8. The system of claim 5, wherein the detecting means includes a proximity switch for sensing the time that the valve reaches its product-dispensing position, the proximity switch generating a timing signal when the valve reaches its product-dispensing position.

9. The system of claim 5, wherein the dispensing means includes a movable piston situated inside a cylinder, and the generating means generates a control signal to deliver pressure to the cylinder to move the piston and dispense the product after the valve reaches its product-dispensing position.

10. The system of claim 9, wherein the sensing means includes a motion detector which generates a timing signal upon movement of the piston to dispense the product.

11. The system of claim 5, wherein the adjusting means includes means for comparing the actual time difference to the predetermined time range to determine whether the actual time difference within the predetermined time range and means for changing the predetermined time that a control signal is generated by the generating means in the next cycle of the dispenser by an amount of time based on the time difference only if the actual time difference is outside the predetermined time range.

12. A control system for controlling the timing of a dispenser apparatus including a valve which moves alternately between a product-loading position and a product-dispensing position in a repeated cycle and means for loading a product into the dispenser from a product supply after each time the valve reaches its product-loading position, the control system comprising means for detecting the time at which the valve reaches its product-loading position, means for generating a control signal at a predetermined time to actuate the loading means after the valve reaches its product-loading position, means for sensing the time that the loading means actually begins loading product, means for determining the actual time difference between the time the valve reaches its product-loading position and the time the loading means actually begins loading the product, and means for adjusting the predetermined time that the control signal is generated to actuate the loading means for the next cycle of the valve by an amount of time based on the time difference to maintain the time difference between the time the rotary valve reaches its product-loading position and the time the loading means begins loading the product within a predetermined time range.

13. The system of claim 12, wherein the predetermined time range is about 5-20 milliseconds.

14. The system of claim 12, wherein the detecting means includes a position sensor for detecting the position of the valve.

15. The system of claim 12, wherein the detecting means includes a proximity switch for sensing the time that the valve reaches its product-loading position, the proximity switch generating a timing signal when the valve reaches its product-loading position.

16. The system of claim 12, wherein the loading means includes a movable piston situated inside a cylinder, and the generating means generates a control signal to deliver pressure to the cylinder to move the piston and load the product after the valve reaches its product-loading position.

17. The system of claim 16, wherein the sensing means includes a motion detector which generates a timing signal upon movement of the piston to load the product.

18. The system of claim 12, wherein the adjusting means includes means for comparing the actual time difference to the predetermined time range to determine whether the actual time difference within the predetermined time range and means for changing the predetermined time that a control signal is generated by the generating means in the next cycle of the dispenser by an amount of time based on the time difference only if the actual time difference is outside the predetermined time range.

19. A control system for controlling the timing of a dispenser apparatus including a valve which moves alternately between a product-loading position and a product-dispensing position in a repeated cycle and means for dispensing a product from the dispenser after each time the valve is in its product-dispensing position, the control system comprising means for detecting the time at which the dispensing means completes dispensing the product, means for generating a control signal at a predetermined time to move the valve from its product-dispensing position to its product-loading position after the dispensing means dispenses the product, means for sensing the time that the valve actually begins moving from its product-dispensing position to its product-loading position, means for determining the actual time difference between the time the dispensing means completes dispensing the product and the time the valve actually begins to move from its product-dispensing position to its product-loading position, and means for adjusting the predetermined time that the control signal is generated to move the valve from its product-dispensing position to its product-loading position for the next cycle of the valve by an amount of time based on said time difference to maintain the time difference between the time the dispensing means completes dispensing the product and the time the valve begins to move from its product-dispensing position to its product-loading position within a predetermined time range.

20. The system of claim 19, wherein the predetermined time range is about 5-20 milliseconds.

21. The system of claim 19, wherein the detecting means includes a position sensor for detecting the position of the dispensing means to determine the time at which the dispensing means completes dispensing the product.

22. The system of claim 21, wherein the dispensing means includes a movable piston situated inside an cylinder, the piston being movable between a first position to load the product and a second position to dispense the product, and the detecting means generates a control signal indicating the time at which the movable piston reaches its second position.

23. The system of claim 19, wherein the sensing means includes a proximity switch for sensing the time that the valve begins to move from its product-dispensing position to its product-loading position.

24. The system of claim 19, wherein the adjusting means includes means for comparing the actual time difference to the predetermined time range to determine whether the actual time difference within the predetermined time range and means for changing the predetermined time that a control signal is generated by the generating means in the next cycle of the dispenser by an amount of time based on the time difference only if the actual time difference is outside the predetermined time range.

25. A control system for controlling the timing of a dispenser apparatus including a valve which moves alternately between a product-loading position and a product-dispensing position in a repeated cycle and means for loading a product into the dispenser from a product supply after each time the valve is in its product-loading position, the control system comprising means for detecting the time at which the dispensing means completes loading the product, means for generating a control signal at a predetermined time to move the valve from its product-loading position to its product-dispensing position after the loading means loads the product into the dispenser, means for sensing the time that the valve actually begins moving from its product-loading position to its product-dispensing position, means for determining the actual time difference between the time the loading means completes loading the product and the time the valve actually begins to move from its product-loading position to its product-dispensing position, and means for adjusting the predetermined time that the control signal is generated to move the valve from its product-loading position to its product-dispensing position for the next cycle of the valve by an amount of time based on said time difference to maintain the time difference between the time the loading means completes loading the product and the time the valve begins to move from its product-loading position to its product-dispensing position within a predetermined time range.

26. The system of claim 25, wherein the predetermined time range is about 5-20 milliseconds.

27. The system of claim 25, wherein the detecting means includes a position sensor for detecting the position of the loading means to determine the time at which the loading means completes loading the product.

28. The system of claim 27, wherein the loading means includes a movable piston situated inside an cylinder, the piston being movable between a first position to load the product and a second position to dispense the product, and the detecting means generates a control signal indicating the time at which the movable piston reaches its first position.

29. The system of claim 25, wherein the sensing means includes a proximity switch for sensing the time that the valve begins to move from its product-loading position to its product-dispensing position.

30. The system of claim 25, wherein the adjusting means includes means for comparing the actual time difference to the predetermined time range to determine whether the actual time difference within the predetermined time range and means for changing the predetermined time that a control signal is generated by the generating means in the next cycle of the dispenser by an amount of time based on the time difference only if the actual time difference is outside the predetermined time range.

* * * * *